US010345875B2

(12) United States Patent
Matteson et al.

(10) Patent No.: US 10,345,875 B2
(45) Date of Patent: Jul. 9, 2019

(54) HYBRID PASSIVE AND ACTIVE COOLING ASSEMBLY

(71) Applicant: Lenovo Enterprise Solutions (Singapore) Pte. Ltd., Singapore (SG)

(72) Inventors: Jason A. Matteson, Raleigh, NC (US); Mark E. Steinke, Durham, NC (US); Aparna Vallury, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 303 days.

(21) Appl. No.: 15/046,480

(22) Filed: Feb. 18, 2016

(65) Prior Publication Data
US 2017/0242463 A1 Aug. 24, 2017

(51) Int. Cl.
*G06F 1/20* (2006.01)
*G05B 15/02* (2006.01)
*F28F 27/00* (2006.01)
*G05D 13/62* (2006.01)
*F25B 21/02* (2006.01)
*F28F 3/02* (2006.01)
*F28D 21/00* (2006.01)

(52) U.S. Cl.
CPC .............. *G06F 1/206* (2013.01); *F25B 21/02* (2013.01); *F28F 3/02* (2013.01); *F28F 27/00* (2013.01); *G05B 15/02* (2013.01); *F25B 2321/021* (2013.01); *F28D 2021/0029* (2013.01); *F28F 2250/08* (2013.01); *F28F 2280/02* (2013.01)

(58) Field of Classification Search
CPC ..................................................... G06F 1/206
See application file for complete search history.

(56) References Cited

U.S. PATENT DOCUMENTS 9,504,189 B1* 11/2016 Campbell .......... H05K 7/20754
2012/0039035 A1* 2/2012 Wei ......................... G06F 1/181
361/679.47
2014/0285964 A1* 9/2014 Atkinson ................ G06F 1/203
361/679.46

OTHER PUBLICATIONS

Ikeda, M.; Nakamura, I.; Kimura, Y.; Noda, H.; Sauciuc, L.; Erturk, H., "Thermal performance of thermoelectric cooler (tec) integrated heat sink and optimizing structure for low acoustic noise / power consumption," in Semiconductor Thermal Measurement and Management Symposium, 2006 IEEE Twenty-Second Annual IEEE , vol., no., pp. 144-151 Mar. 4-16, 2006 doi: 10.1109/STHERM.2006.1625220.

* cited by examiner

*Primary Examiner* — Seahvosh Nikmanesh
(74) *Attorney, Agent, or Firm* — Jeffrey L. Streets

(57) ABSTRACT

A cooling assembly for cooling a processor includes a heat sink base defining a first area and a second area, a plurality of heat sink fins extending from the first area, a thermoelectric cooling module having a cold side and hot side, wherein the cold side is in contact with the second area, and a heat sink module in contact with the hot side. In use, a method includes monitoring a processor parameter selected from processor power consumption and processor temperature, and causing airflow across the plurality of heat sink fins and the heat sink module. The method further includes powering on the thermoelectric cooling module in response to the processor parameter having a value greater than a first threshold value, and powering off the thermoelectric cooling module in response to the processor parameter having a value less than a second threshold value.

11 Claims, 5 Drawing Sheets

HYBRID PASSIVE AND ACTIVE COOLING ASSEMBLY

BACKGROUND

Field of the Invention

The present invention relates to heat exchangers for cooling components of a computer system and methods of cooling computer components.

Background of the Related Art

Computer systems are being designed and built with an ever increasing number of heat generating components. Given the limited footprint of most computing systems, a continuous increase in the number of heat generating components creates challenging heat dissipation issues. These issues if not dealt with adequately can harm the structural and data integrity of the computer system, making the effect felt both at a system and component level.

Most electronic packages or nodes in a datacenter are housed in chassis that are disposed in racks. Traditionally, these nodes have been cooled by forced air cooling using air moving devices, such as fans and blowers, selectively disposed somewhere in the environment as to allow optimum air flow. These air moving devices are often designed to displace hot air away from the components by creating parallel air flow paths that circulate through the chassis and rack. For example, air moving systems may take the form of a computer room air conditioning (CRAC) system, a chassis fan system, and/or fans in an individual node or group of nodes.

Current designs of information technology equipment will preferably account for the needs of multiple market segments, such as acoustically sensitive environments, high performance clusters, or power aware enterprise solutions. In trying to meet the needs of this wide range of needs, cooling designs may be simply over-designed to work in a high performance environment while often being sub-optimized for any particular application.

BRIEF SUMMARY

One embodiment of the present invention provides a cooling assembly comprising a heat sink base defining a first area and a second area, a plurality of heat sink fins extending from the first area of the heat sink base, a thermoelectric cooling module having a cold side and hot side, wherein the cold side is in contact with the second area of the heat sink base, and a heat sink module in contact with the hot side of the thermoelectric cooling module.

Another embodiment of the present invention provides a method comprising monitoring a processor parameter selected from processor power consumption and processor temperature, and causing airflow across a passive heat exchanger in thermal communication with the processor and an active cooling device in thermal communication with the processor. The method further comprises powering on the active cooling device in response to the processor parameter having a value greater than a first threshold value, and powering off the active cooling device in response to the processor parameter having a value less than a second threshold value. In accordance with the method, the active cooling device includes a thermoelectric module having a cold side in thermal communication with the processor, a hot side in thermal communication with a heat sink module, and electrical contacts for receiving electrical power when the active cooling device is powered on.

Yet another embodiment of the present invention provides a non-volatile computer readable storage medium having non-transitory program instructions embodied therewith, the program instructions executable by a processor to cause the processor to perform a method. The method comprises monitoring a processor parameter selected from processor power consumption and processor temperature, and controlling a speed of a fan to force airflow across a passive heat exchanger in thermal communication with the processor and an active cooling device in thermal communication with the processor. The method further comprises powering on the active cooling device in response to the processor parameter having a value greater than a first threshold value, and powering off the active cooling device in response to the processor parameter having a value less than a second threshold value. In accordance with the method, the active cooling device includes a thermoelectric module having a cold side in thermal communication with the processor, a hot side in thermal communication with a heat sink module, and electrical contacts for receiving electrical power when the active cooling device is powered on.

DETAILED DESCRIPTION

Figure 1:
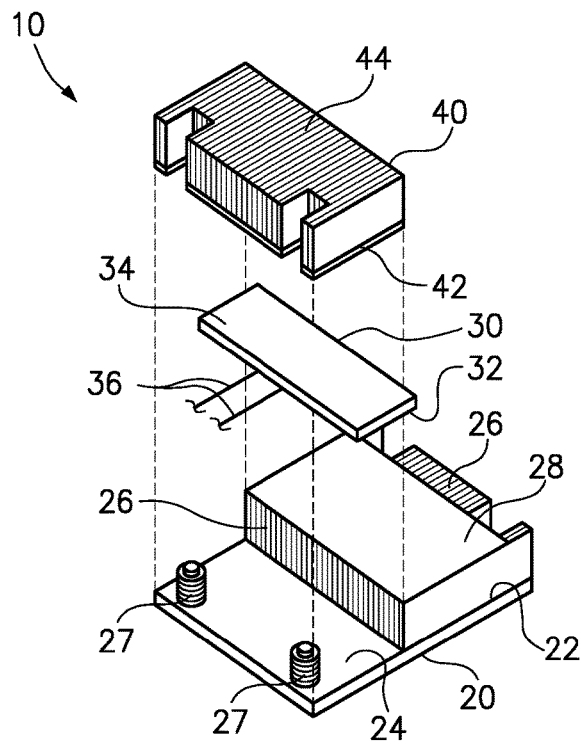
FIG. 1 is an exploded view of a cooling assembly.

One embodiment of the present invention provides a cooling assembly comprising a heat sink base defining a first area and a second area, a plurality of heat sink fins extending from the first area of the heat sink base, a thermoelectric cooling module having a cold side and hot side, wherein the cold side is in contact with the second area of the heat sink base, and a heat sink module in contact with the hot side of the thermoelectric cooling module.

The cooling assembly is adapted to replace a conventional passive heat sink for cooling a heat-generating component. For example, in a computer system, the cooling assembly may be used to cool a processor, graphics adapter or network interface controller. Typically, the heat sink base will have a surface adapted for contact with the heat-generating component, and the heat sink base will be secured in that position during use. The heat sink base, the heat sink fins, and the heat sink module should have a high thermal conductivity, which may be provided by a metal, in order to conduct heat away from the heat-generating component. Suitable metals may include, without limitation, copper and aluminum. Optionally, the heat transfer of the heat sink base may be enhanced by incorporating a heat pipe in any one or more location. In particular, a heat pipe may extend from the second area of the heat sink base to a contact area where the heat sink base contacts the heat-generating device.

The cooling assembly is preferably used in combination with an air moving device directed to force airflow to pass over the plurality of heat sink fins and the heat sink module. Such an air moving device may be an individual fan, a fan module, a blower module, or a computer room air conditioning (CRAC) system, so long as air is forced across the cooling assembly to withdraw heat. The air moving device preferably establishes an airflow direction relative to the cooling assembly, and the heat sink module is preferably positioned downstream in the airflow direction from the plurality of heat sink fins. As used herein, the term "fins" includes pins, honeycomb and other known structures for exchange of heat into an airflow stream.

The heat sink module preferably does not have any direct contact with the heat sink base or the plurality of heat sink fins that extend from the first area of the heat sink base. This type of isolation allows the heat sink module to take on a higher temperature when the thermoelectric cooling module is turned on, while preventing that heat from spreading back to the heat sink base or fins. Rather, the heat in the heat sink module must be transferred into the airflow moving across the heat sink module. For this purpose, the heat sink module itself may include a second heat sink base and a second plurality of heat sink fins extending from the second heat sink base. It is preferable that the second plurality of heat sink fins are parallel to the first plurality of heat sink fins. Accordingly, airflow through the first and second plurality of heat sink fins is not impeded. Optionally, either or both of the first and second plurality of heat sink fins may be open at a distal end of the fins or enclosed with a top plate.

In one implementation, a baseboard management controller is responsible for controlling whether electrical power is provided to the thermoelectric cooling module. Furthermore, the baseboard management controller may also be responsible for controlling a rate of the airflow produced by the air moving device. This allows the baseboard management controller to balance use of the thermoelectric cooling module and the air moving device, perhaps depending upon operational considerations or user selection of an operational mode. For example, an acoustic mode would favor greater use of the thermoelectric cooling module over additional fan speed, since the solid state thermoelectric cooling module is silent. In an energy conservation mode, the thermoelectric cooling module may be turned off and the fan speed limited to a low speed. In a high performance mode, both the fan speed and the thermoelectric cooling module may be used up to a maximum output. Preferably, the cooling assembly is designed with sufficient passive cooling capacity (i.e., sufficient surface area of the plurality of heat sink fins extending from the heat sink base) so that the heat-generating component being cooled can operate an average capacity without need for the active cooling capacity (i.e., applying electrical power to the thermoelectric cooling module). For example, the passive heat sink portion of the cooling assembly may be designed to sustain an acceptable processor operating temperature under typical workloads (say, less than 70% CPU maximum power), while the active heat sink portion (i.e., the thermoelectric cooling module and associated heat sink module) would only become needed to support high performance workloads (say, greater than 70% CPU maximum power).

Another embodiment of the present invention provides a method comprising monitoring a processor parameter selected from processor power consumption and processor temperature, and causing airflow across a passive heat exchanger in thermal communication with the processor and an active cooling device in thermal communication with the processor. The method further comprises powering on the active cooling device in response to the processor parameter having a value greater than a first threshold value, and powering off the active cooling device in response to the processor parameter having a value less than a second threshold value. In one option, the first threshold value may be greater than the second threshold value. Alternatively, the first threshold value may be equal to the second threshold value.

In accordance with the method, the active cooling device includes a thermoelectric module having a cold side in thermal communication with the processor, a hot side in thermal communication with a heat sink module, and electrical contacts for receiving electrical power when the active cooling device is powered on. The method may be used in conjunction with a cooling assembly having any of the features described herein.

Yet another embodiment of the present invention provides a non-volatile computer readable storage medium having non-transitory program instructions embodied therewith, the program instructions executable by a processor to cause the processor to perform a method. The method comprises monitoring a processor parameter selected from processor power consumption and processor temperature, and controlling a speed of a fan to force airflow across a passive heat exchanger in thermal communication with the processor and an active cooling device in thermal communication with the processor. The method further comprises powering on the active cooling device in response to the processor parameter having a value greater than a first threshold value, and powering off the active cooling device in response to the processor parameter having a value less than a second threshold value. In accordance with the method, the active cooling device includes a thermoelectric module having a cold side in thermal communication with the processor, a hot side in thermal communication with a heat sink module, and electrical contacts for receiving electrical power when the active cooling device is powered on.

The foregoing computer program products may further include program instructions for implementing or initiating any one or more aspects of the methods described herein. Accordingly, a separate description of the methods will not be duplicated in the context of a computer program product.

FIG. 1 is an exploded view of a cooling assembly 10. The cooling assembly 10 includes a heat sink base 20 defining a first area 22 and a second area 24, and a plurality of heat sink fins 26 extending from the first area 22 of the heat sink base.

The cooling assembly 10 also includes a thermoelectric cooling module 30 having a cold side 32 (underneath) and a hot side 34 (top side as shown), wherein the cold side 32 is downwardly directed for contact with the second area 24 of the heat sink base 20. A pair of wires 36 provide electrical power to the thermoelectric cooling module 30 when the module 30 is turned on.

A heat sink module 40 is provided for contact with the hot side 34 of the thermoelectric cooling module 30. The heat sink module 40 has its own heat sink base 42 and a plurality of heat sink fins 44 extending from the heat sink base 42. As shown, a plate 28 encloses the distal end of the plurality of heat sink fins 26, whereas the distal end of the heat sink fins 44 of the heat sink module 40 are open. However, either or both sets of heat sink fins 26, 44 may be open, enclosed, or partially enclosed. As previously stated, the heat sink fins may also encompass heat sink pins, honeycomb structures, or other heat dissipation structures for transferring heat into airflow passing across the cooling assembly 10. A pair of spring latches 27 are secured to the heat sink base 20 and are adapted to secure the heat sink module 40 in an operative position with the thermoelectric cooling module 30 disposed between the heat sink base 20 and the base 42 of the heat sink module 40.

Figure 2:
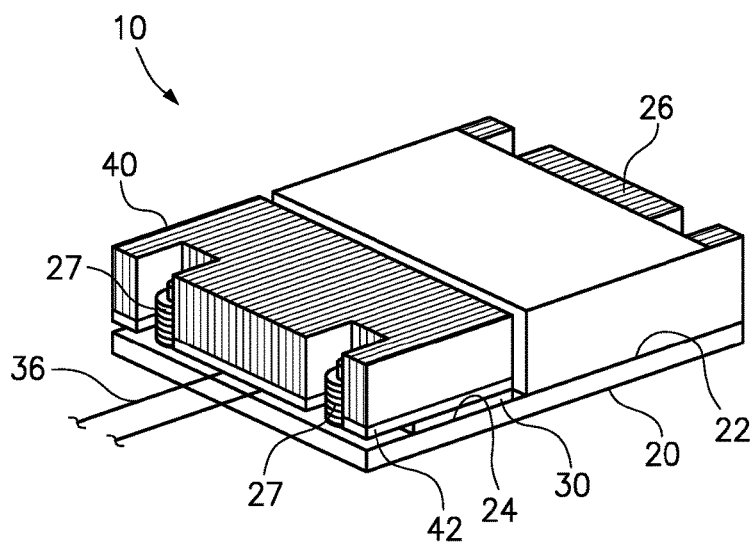
FIG. 2 is a perspective view of the cooling assembly.

FIG. 2 is a perspective view of the cooling assembly 10 after being fully assembled. Accordingly, the spring latches 27 have secured the heat sink module 40 with its base 42 pressed in contact with the hot side of the thermoelectric cooling module 30, and the cold side of the thermoelectric cooling module 30 pressed in contact with the second area 24 of the heat sink base 20. The pair of wires 36 extend to the side of the cooling assembly for connection to a controllable power source (not shown). As shown, the plurality of heat sink fins 26 run parallel to the heat sink fins 44 of the heat sink module 40.

Figure 3:
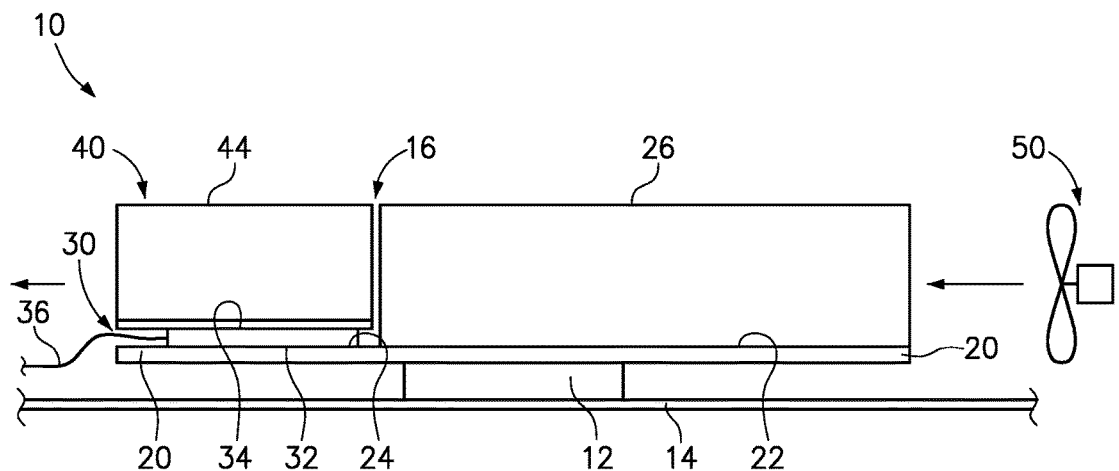
FIG. 3 is a side view of the cooling assembly in thermal communication with a processor on a circuit board.

FIG. 3 is a side view of the cooling assembly 10 in thermal communication with a heat-generating processor 12 on a circuit board 14. In a passive mode, heat from the processor 12 is transferred to the heat sink base 20 and into the plurality of heat sink fins 26 extending from the first area 22 of the heat sink base 20. A fan 50 causes airflow across the cooling assembly 10 in an airflow direction (see arrows). Accordingly, the airflow passes over and between the heat sink fins 26 to receive and carry away heat from the fins 26. Furthermore, while the thermoelectric cooling module 30 may have a low thermal conductivity when turned off, it is expected that some amount of heat will conduct from the second area 24 of the heat sink base 20 through the thermoelectric cooling module 30 and into the heat sink module 40. In this manner, the airflow that has passed through the heat sink fins 26 will also pass through the heat sink fins 44 to receive and carry away additional heat. In the embodiment shown, a gap 16 is shown between the heat sink fins 26 and the heat sink module 40 to prevent heat from being conductively transferred there between.

In an active mode, heat from the processor 12 is still transferred to the heat sink base 20 and into the plurality of heat sink fins 26 extending from the first area 22 of the heat sink base 20, such that the airflow can receive and carry away heat from the fins 26. However, unlike with the passive mode, the active mode includes the application of electrical power to the thermoelectric cooling module 30, such that the downwardly facing cold side 32 becomes cold and the upwardly facing hot side 34 becomes hot. This is phenomena is known as the Peltier effect, in which the application of electrical energy induces a heat flux between junctions formed between an n-type semiconductor material and a p-type semiconductor material.

Accordingly, the cold side 32 will draw additional heat from the heat-generating processor 12 and drive that heat to the hot side 34 where the heat sink module 40 can then transfer the heat into the airflow to be carried away. Accordingly, the active mode provides enhanced cooling of the processor. It is recognized that the airflow through the heat sink module 40 may already be warmed as it passes through the heat sink fins 26. However, in the active mode, the temperature of the heat sink module 40 will be sufficient greater than the warmed air temperature such that heat transfer into the air will still be significant. The use of the thermoelectric cooling module 30 drives heat into the heat sink module 40 such that the temperature of the heat sink module 40 may be greater than the temperature of the heat sink fins 26 that are coupled directly to the heat sink base 20.

Figure 4:
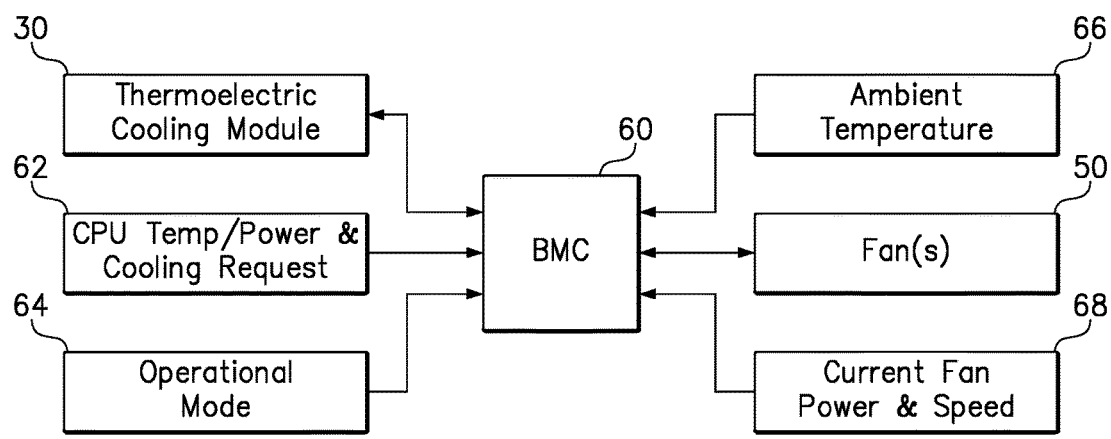
FIG. 4 is partial system diagram of BMC receiving data input and sending control signals.

FIG. 4 is diagram of a system for controlling the cooling assembly 10 of FIG. 3. In the embodiment shown, a baseboard management controller (BMC) 60 controls the thermoelectric cooling module 30 and the fan 50. The BMC 60 executes program instructions that base this control on one or more parameters input to the BMC. For example, the BMC 60 may receive data input from the processor 12, an operating system, temperature sensors, and/or a fan controller for the fans. Specifically, the BMC 60 may receive input identifying the processor (CPU) temperature, processor power or a cooling request 62 from the processor 12, a user-selected operational mode 64 (i.e., acoustic, energy conservation, high performance, etc.) from an operating system, and ambient inlet air temperature 66 from a temperature sensor, and/or a current fan power or speed 68 from a fan controller. For example, the BMC may use an Intelligent Platform Management Interface (IPMI) standard communication to poll the appropriate components as shown, and may then determine a proper cooling action. As described herein, the BMC may determine when to enter an active mode, such that energy is provided to the thermoelectric cooling module and cooling of a heat-generating components is enhanced.

Figure 5:
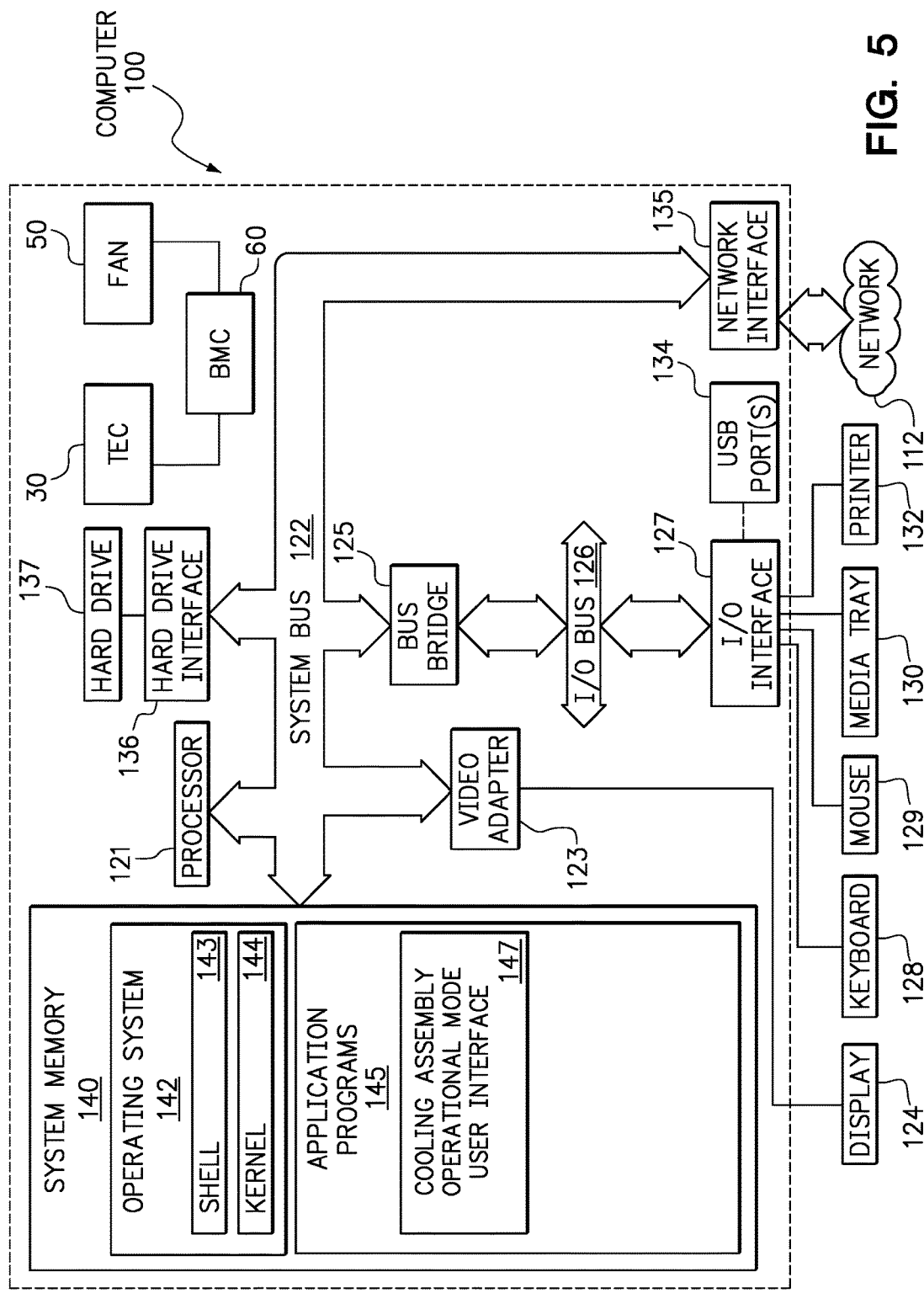
FIG. 5 is a computer diagram.

FIG. 5 is a diagram of a computer 100 in which a cooling assembly of the present invention may be beneficially employed. In this non-limiting example, the computer 100 includes a processor unit 121 that is coupled to a system bus 122. The processor unit 121 may utilize one or more processors, each of which has one or more processor cores. A video adapter 123, which drives/supports a display 124, is also coupled to the system bus 122. The system bus 122 is coupled via a bus bridge 125 to an input/output (I/O) bus 126. An I/O interface 127 is coupled to the I/O bus 126 and provides communication with various I/O devices, including a keyboard 128, a mouse 129, a media tray 130 (which may include storage devices such as CD-ROM drives, multimedia interfaces, etc.), a printer 132, and USB port(s) 134. As shown, the computer 100 is able to communicate with other network devices via the network 112 using a network adapter or network interface controller 135.

A hard drive interface 136 is also coupled to the system bus 122 and interfaces with a hard disk drive 137. In a preferred embodiment, the hard disk drive 37 communicates with system memory 140, which is also coupled to the system bus 122. System memory includes the lowest level of volatile memory in the computer 100. This volatile memory may include additional higher levels of volatile memory (not shown), including, but not limited to, cache memory, registers and buffers. Data that populates the system memory 140 may include an operating system (OS) 142 and application programs 145.

The operating system 142 includes a shell 143 for providing transparent user access to resources such as application programs 145. Generally, the shell 143 is a program that provides an interpreter and an interface between the user and the operating system. More specifically, the shell 143 executes commands that are entered into a command line user interface or from a file. Thus, the shell 143, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 144) for processing. Note that while the shell 143 is a text-based, line-oriented user interface, the present invention will equally well support other user interface modes, such as graphical, voice, gestural, etc.

As depicted, the operating system 142 also includes the kernel 144, which includes lower levels of functionality for the operating system 142, including providing essential services required by other parts of the operating system 142 and application programs 145, including memory management, process and task management, disk management, and mouse and keyboard management. The application programs 145 in the system memory of the computer 100 may include, without limitation, cooling assembly operational mode user interface 147. Furthermore, a baseboard management controller 60 is in communication with the thermoelectric cooling (TEC) module 30 and the fan 50, as shown in FIGS. 3-4. The user interface 147 may share the user-selected operational mode with the BMC 60 for the purpose of implementing proper control of the thermoelectric cooling module 30 and the fan 50.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 6:
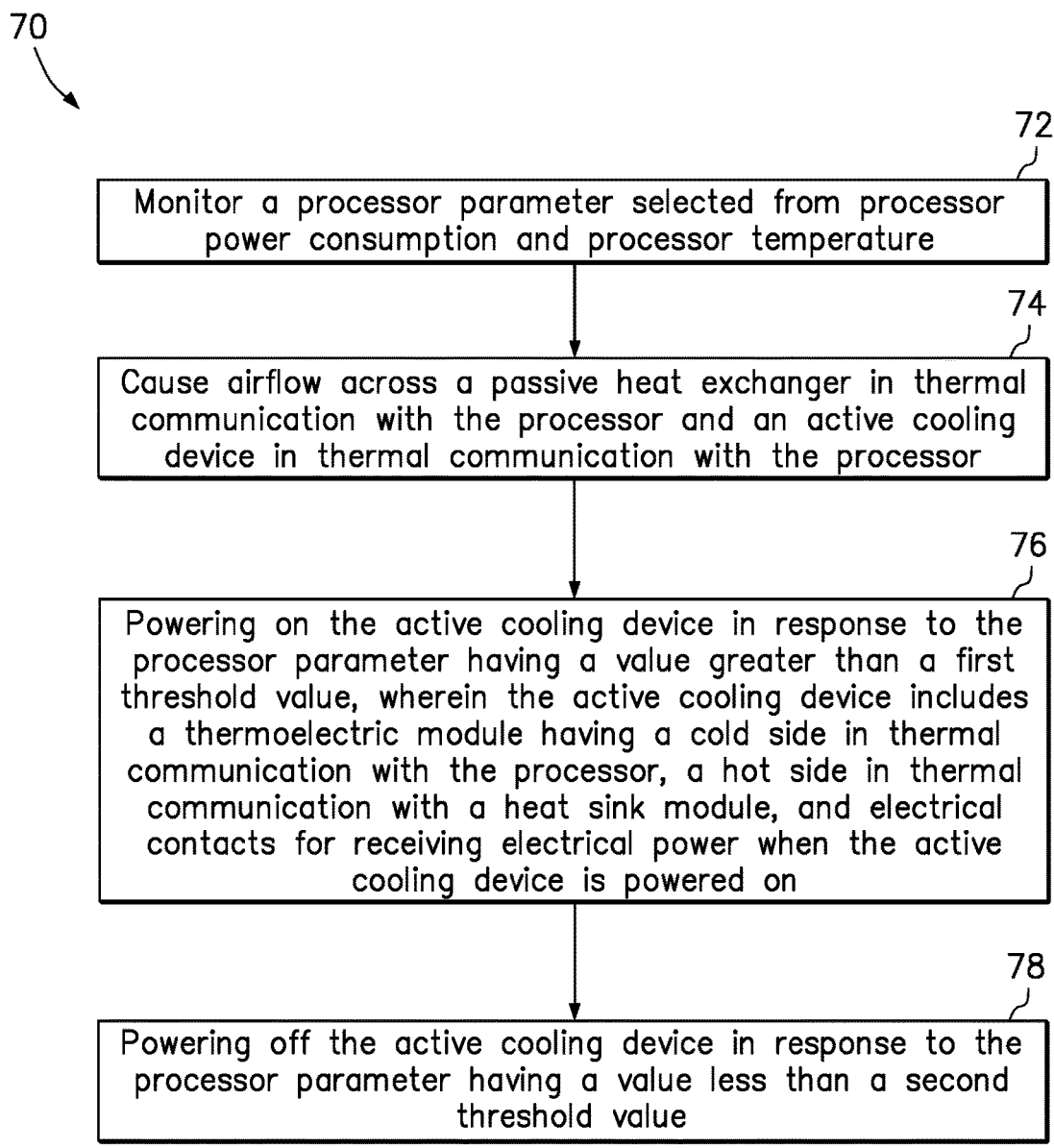
FIG. 6 is a flowchart of a method according to one embodiment of the invention.

FIG. 6 is a flowchart of a method 70 according to one embodiment of the invention. In step 72, the method monitors a processor parameter selected from processor power consumption and processor temperature. In step 74, the method causes airflow across a passive heat exchanger in thermal communication with the processor and an active cooling device in thermal communication with the processor. In step 76, the method includes powering on the active cooling device in response to the processor parameter having a value greater than a first threshold value, wherein the active cooling device includes a thermoelectric module having a cold side in thermal communication with the processor, a hot side in thermal communication with a heat sink module, and electrical contacts for receiving electrical power when the active cooling device is powered on. In step 78, the method includes powering off the active cooling device in response to the processor parameter having a value less than a second threshold value.

Figure 7:
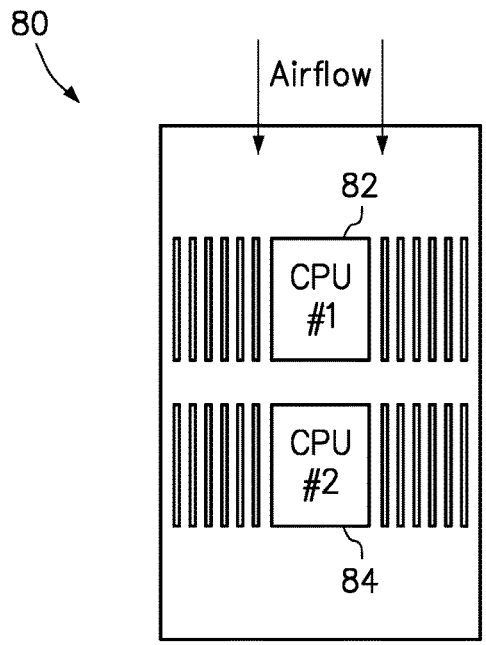
FIG. 7 is a schematic top view of a server motherboard including two CPUs and associated memory modules.

FIG. 7 is a schematic top view of a server motherboard 80 including a first processor 82 (CPU #1) and a second processor 84 (CPU #2) that is downstream in an airflow direction from the first processor 82. As shown, each of the processors 82, 84 has associated memory modules on either side thereof.

Due the first processor 82 being directly in front of the second processor 84, the airflow across the motherboard 80 is warmed by the first processor 82 before it passes over the second processor 84. Therefore, the warmed airflow does not cool the second processor 84 as well as the cooler airflow cools the first processor 86. A conventional solution to this problem is to simply increase a fan speed so that the overall airflow is sufficient to cool the second processor 84. Of course, this increased airflow rate may be more than what is needed by either the first processor 82 or the memory modules.

However, a cooling assembly in accordance with an embodiment of the present invention may be used to cool the second processor 84. While the warmed airflow may be insufficient to cool the second processor 84 at a given airflow rate, the cooling assembly may be put into active mode such that the thermoelectric cooling module is powered on to enhance cooling of the second processor 84. As a result, both the first and second processors may be adequately cooled without increasing the fan speed.

Figure 8:
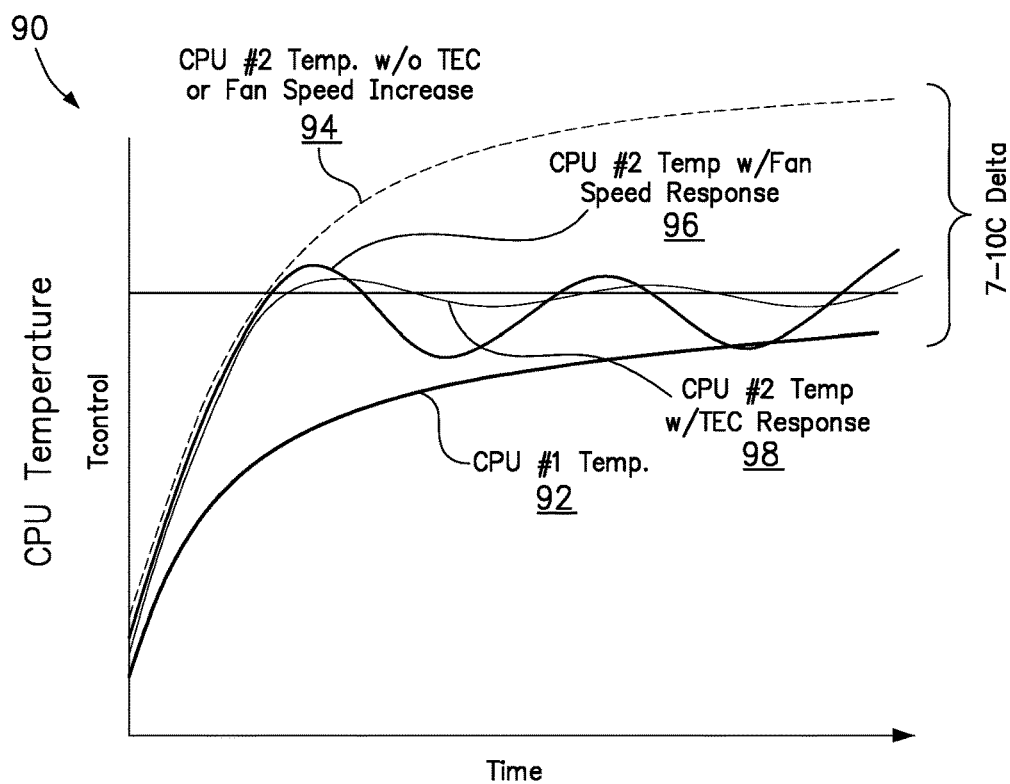
FIG. 8 is a graph of CPU temperature as a function of time for both an upstream CPU and a downstream CPU.

FIG. 8 is a graph 90 of CPU temperature as a function of time for both a first upstream processor (i.e., CPU #1 in FIG. 7) and a second downstream processor (i.e., CPU #2 in FIG. 7). Line 92 graphs the CPU #1 temperature at a given fan speed. Line 94 graphs the CPU #2 temperature at the given fan speed without employing the thermoelectric cooling module. As expected, the temperature of CPU #2 is 7-10 degrees Celsius higher than the temperature of CPU #1 due to the fact that CPU #1 warms the air before it reaches CPU #2 (see FIG. 7). A method of controlling a cooling assembly (see cooling assembly 10 in FIGS. 2-3) may take various steps to reduce the temperature of CPU #2 so that it does not significantly exceed a temperature control setpoint ("Tcontrol" horizontal line). In one option, the method may increase the fan speed. Line 96 graphs the CPU #2 temperature in response to increasing the fan speed to the entire chassis or motherboard. However, line 98 graphs the CPU #2 temperature in response to powering on the thermoelectric cooling module without increasing the fan speed. Since powering on the thermoelectric cooling module and increasing the fan speed both achieve the desired temperature control, the method may select either option. It should be recognized that if a user has selected an acoustic mode, then use of the thermoelectric cooling module would be favored over increasing the fan speed. In an energy conservation mode, the method may use whichever option consumes less energy, perhaps even selecting to use the thermoelectric cooling module at a low power and increasing the fan speed by only a small speed step. Still further, in a performance mode, it may be necessary to both power on the thermoelectric cooling module and increase the fan speed in order to allow the processor to run at its maximum power.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following non-volatile computer readable storage media: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such non-volatile computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a non-volatile computer readable storage medium that can direct a computer, other programmable data processing apparatus, or other devices to function in a particular manner, such that the program instructions stored in the non-volatile computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   monitoring a processor parameter selected from processor power consumption and processor temperature;
   causing airflow across a passive heat exchanger in thermal communication with the processor and an active cooling device in thermal communication with the processor;
   powering on the active cooling device in response to the processor parameter having a value greater than a first threshold value, wherein the active cooling device includes a thermoelectric module having a cold side in thermal communication with the processor, a hot side in thermal communication with a heat sink module, and electrical contacts for receiving electrical power when the active cooling device is powered on; and
   powering off the active cooling device in response to the processor parameter having a value less than a second threshold value.

2. The method of claim 1, wherein the passive heat exchanger includes a plurality of heat sink fins extending from a first area of a heat sink base that is in contact with the processor.

3. The method of claim 2, wherein the cold side of the thermoelectric module is in contact with a second area of the heat sink base.

4. The method of claim 3, wherein the heat sink module includes a second heat sink base and a second plurality of heat sink fins extending from the second heat sink base.

5. The method of claim 1, wherein the first threshold value is greater than the second threshold value.

6. The method of claim 1, wherein the first threshold value is equal to the second threshold value.

7. The method of claim 1, wherein the active cooling device is downstream in a direction of the airflow from the passive heat exchanger.

8. The method of claim 1, further comprising:
   a baseboard management controller controlling a speed of a fan causing the airflow and controlling the powering on and powering off of the active cooling device.

9. A non-volatile computer readable storage medium having non-transitory program instructions embodied therewith, the non-transitory program instructions executable by a processor to cause the processor to perform a method comprising:
   monitoring a processor parameter selected from processor power consumption and processor temperature;
   controlling a speed of a fan to force airflow across a passive heat exchanger in thermal communication with the processor and an active cooling device in thermal communication with the processor;
   powering on the active cooling device in response to the processor parameter having a value greater than a first threshold value, wherein the active cooling device includes a thermoelectric module having a cold side in thermal communication with the processor, a hot side in thermal communication with a heat sink module, and electrical contacts for receiving electrical power when the active cooling device is powered on; and
   powering off the active cooling device in response to the processor parameter having a value less than a second threshold value.

10. The non-volatile computer readable storage medium of claim 9, wherein the first threshold value is greater than the second threshold value.

11. The non-volatile computer readable storage medium of claim 9, wherein the first threshold value is equal to the second threshold value.

* * * * *